June 24, 1947.  F. GARBARINO  2,423,065
TWO-WHEEL WAREHOUSE TRUCK
Filed Oct. 12, 1945
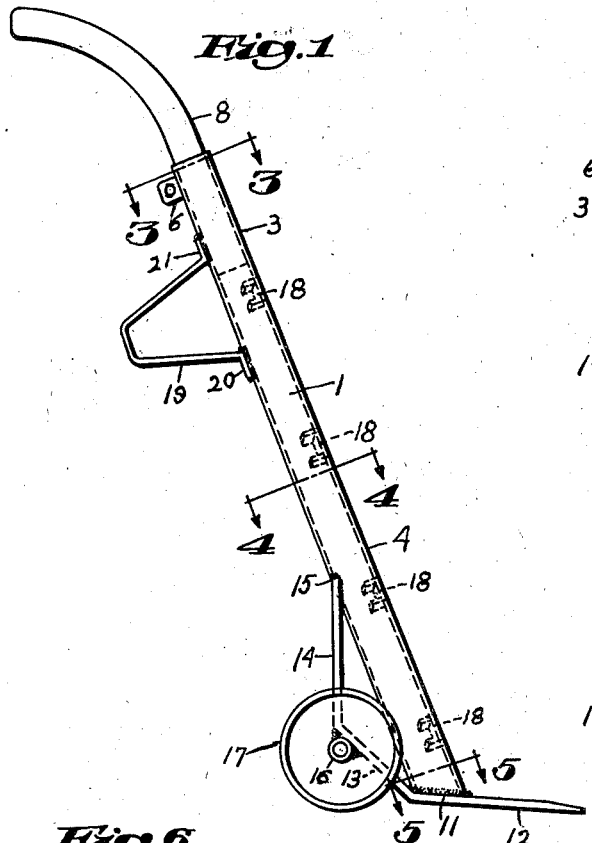
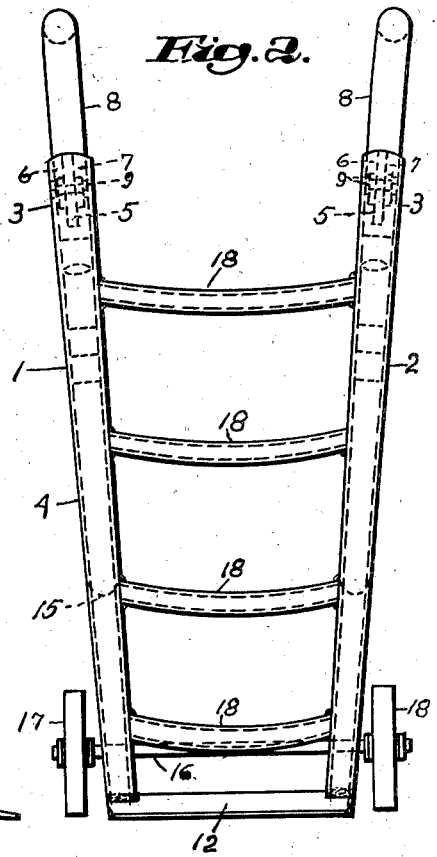
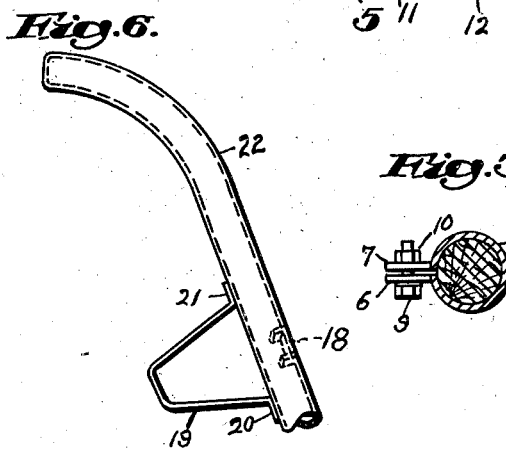
Inventor:
Frank Garbarino,
by Heard, Smith & Tennant
Attorneys Patented June 24, 1947

2,423,065

UNITED STATES PATENT OFFICE 2,423,065

TWO-WHEEL WAREHOUSE TRUCK

Frank Garbarino, Waltham, Mass., assignor to Lewis-Shepard Company, Watertown, Mass., a corporation of Massachusetts Application October 12, 1945, Serial No. 621,867

3 Claims. (Cl. 280—56)

This invention relates to improvements in two-wheel warehouse trucks and the principal object of the invention is to provide a truck of this character of rigid integral construction which can be conveniently and economically manufactured, and in which the side rails are of such construction that maximum strength is obtained where the most strain imposed by the load occurs.

More specifically the invention comprises a two-wheel warehouse truck in which the side frames are of tubular form comprising an upper cylindrical handle section merging into a longer lower section of elliptical cross section in which the vertical diameter thereof gradually and progressively increases to the lower end of the side frame, whereby maximum strength of the side rails is obtained where the most strain is imposed upon them by the load.

A further object of the invention is to provide the side rails with a nose welded thereto having angularly bent extensions forming wheel brackets, to which the axle for the wheels is welded, with the ends of said extensions fitting and welded to the under faces of the side rails, thereby providing a construction and assemblage which can be readily manufactured and when thus assembled of maximum rigidity.

A further object of the invention is to provide a two-wheel warehouse truck of the character above described with a series of suitably spaced cross bars having concavedly curved ends respectively fitting the convex curvature of the side rails and which will not extend above the plane of the side rails.

A further feature of the invention comprises a construction in which the handle sections may be provided with curved extensions adapted conveniently to be grasped by the operator, or alternatively so constructed as to permit separate curved handles of wood, or other material, to be telescopically clamped therein.

These and other objects and features of the invention will more fully appear from the following description and the accompanying drawings and will be particularly pointed out in the claims.

Preferred embodiments of the invention are illustrated in the accompanying drawings, in which, Fig. 1 is a side elevation of a two-wheel warehouse truck embodying the invention having detachable curved handles telescopically clamped in the cylindrical tubular section of the side rails;

Fig. 2 is a plan view of the same;

Fig. 3 is a transverse sectional view on line 3—3 Fig. 1, illustrating the manner in which the curved handle is clamped in the cylindrical handle section of the side rail;

Fig. 4 is a transverse sectional view on line 4—4 Fig. 1;

Fig. 5 is a transverse sectional view on line 5—5 Fig. 1; and,

Fig. 6 is a detail side elevation of a construction in which the cylindrical handle section is provided with a continued curved hand gripping portion.

The invention as illustrated herein comprises tubular side rails 1 and 2 of like construction which, as illustrated in Fig. 2, converge downwardly from the upper to the lower end.

Each of the side rails is of tubular form having an upper relatively short cylindrical section 3 merging into a longer section 4 of elliptical transverse cross section with the major axis thereof extending vertically when the side rails are in horizontal position and progressively increasing in length and the minor axis gradually decreasing in length from the cylindrical section to the lower end of the main section as suggested by the cross sectional view shown in Figs. 4 and 5. The upper cylindrical tubular section may have a slit 5 extending downwardly from its upper end part of the length of the tubular section with laterally extending ears 6 and 7 welded to the tubular section at or adjacent the slit, thereby providing an expansible portion into which the straight end of a curved handle 8 may be inserted and firmly clamped therein by a bolt 9 extending through said ears with a nut 10 on the bolt for clamping the slitted portion of the cylindrical section upon the handle.

The lower end of each of the elliptical tubular sections 4 of the side rails is provided with a flat face 11 which is disposed at a suitable angle to the longitudinal axis of the longer section. A nose 12, which may be a flat plate or suitably skeletonized, is welded to the flat ends of the elliptical sections 4 with the nose extending forwardly well beyond the side rails. The nose is provided at its ends with rearward extensions each of which is bent to form an upwardly inclined section 13 of suitable length, and a further section 14 bent forwardly and having a preferably concave end 15 fitting the curvature of the elliptical main section engaged thereby at a suitable distance from the nose 12. The wheel axle 16 is welded to the upwardly inclined sections 13 of the rearward extensions of the nose at such position that the periphery of the wheels 17 which are mounted upon the axle 16 will be properly positioned relatively to the nose so that the nose can be readily inserted beneath the article to be raised and the side rails thereupon tipped by the operator around the axle as a fulcrum to raise the load from the floor and transport it to its destination.

The relative inclination of the side rails to the nose can be varied by changing the angular relation of the flat ends of the legs to the axis thereof, bending the rearward extensions of the nose properly to engage the side rails, and welding the wheel axle 18 upon the sections 13 in such position that the periphery of the wheels will be properly positioned in respect to the nose.

Suitable means are provided for rigidly connecting the side rails together in such manner that the cross bars will not extend above the plane of the upper edges of the side rails as distinguished from usual constructions in which the side rails are of conventional structural beams and the cross bars therefor rest upon and are welded to the upper faces of such structural members.

In the preferred construction illustrated the cross bars 18 are of channel shape and provided with concavedly curved ends which fit the convex surfaces of the side rails at the respective positions engaged thereby and are welded to the side rails thereby forming an integral construction. The cross bars may be flat or downwardly curved to receive the load in accordance with the use in which the truck is employed; for example, the cross bars may be straight if rectangular or flat articles are to be transported, or concavedly curved if barrels or other cylindrical articles are to be carried by the truck.

The truck may be provided adjacent the upper end with usual types of U-shaped legs 19 having laterally extending flanges 20 and 21 but which differ from usual constructions in that the upper faces of the flanges are concaved to fit the curvature of the respective side rail sections engaged thereby.

As above stated the cylindrical handle section 3 of the sections of the side rails may be provided with an integral curved extension 22 as illustrated in Fig. 6 as distinguished from a detachable handle construction shown in Figs. 1 and 2.

By reason of the present invention a warehouse truck is provided which is of simple and economical construction and of maximum rigidity and a strength of the side rails is obtained where the greatest strain is imposed upon them by the load.

It will be understood that the particular embodiment of the invention shown and described herein is of an illustrative character and is not restrictive of the meaning and scope of the following claims.

Having thus described the invention, what is claimed as new, and desired to be secured by Letters Patent, is:

1. A two-wheel warehouse truck comprising side rails having upper cylindrical handle sections respectively merging into longer main sections of elliptical transverse cross section in which the major diameter of said elliptical cross sections extends vertically when the side rails are in horizontal position and gradually and progressively increases from the handle sections to the lower ends of the side rails, said lower ends having flat surfaces in suitable angular relation to the longitudinal axis of the main side rail sections, a nose underlying and welded to said flat ends, and extending forwardly therefrom and having integral angularly bent rearward extensions welded at their ends to the respectve side rails forming wheel hangers and suitably spaced cross bars having their ends welded to the respective side rails.

2. A two-wheel warehouse truck comprising side rails having upper cylindrical handle sections respectively merging into longer main sections of elliptical transverse cross section in which the major diameter of said elliptical cross sections extends vertically when the side rails are in horizontal position and gradually and progressively increases from the handle sections to the lower ends of the side rails, said lower ends having flat surfaces in suitable angular relation to the longitudinal axis of the main side rail sections, a flat nose underlying and welded to said flat ends and extending forwardly therefrom and having at its ends integral narrow rearward extensions underlying the respective side rails and angularly bent to form wheel hangers and welded at their ends to the respective side rails, and suitably spaced channel-shaped cross bars having concavedly curved ends fitting the convex curvature of the side rails engaged thereby and welded thereto.

3. A two-wheel warehouse truck comprising side rails having upper cylindrical handle sections respectively merging into longer main sections of elliptical transverse cross section in which the major diameter of said elliptical cross sections extends vertically when the side rails are in horizontal position and gradually and progressively increases from the handle sections to the lower ends of the side rails, said lower ends having flat surfaces in suitable angular relation to the longitudinal axis of the main side rail sections, a flat nose underlying and welded to said flat ends and extending forwardly therefrom and having at its ends integral narrow rearward extensions underlying the respective side rails bent upwardly from the plane of the flat ends of the side rails and a continuing section bent upwardly into engagement with the respective side rails and having concave upper ends fitting the curvature of the side rails and welded thereto, an axle for the wheels welded to the upwardly bent sections and projecting therefrom, and wheels mounted upon the projecting ends of said axle, and a plurality of suitably spaced channel shaped cross bars respectively having concaved ends abutting and fitting the curvature of the side rails and welded thereto.

FRANK GARBARINO.

REFERENCES CITED

The following references are of record in the file of this patent:

UNITED STATES PATENTS

| Number | Name | Date |
|---|---|---|
| Re. 4,700 | Tuthill | Jan. 2, 1872 |
| 1,187,939 | Taylor | June 20, 1916 |
| 1,215,633 | Dorsey | Feb. 13, 1917 |
| 1,385,514 | Wood | July 26, 1921 |
| 1,711,824 | Barnhart | May 7, 1929 |
| 305,880 | Annin | Sept. 30, 1884 |
| 373,795 | Beaman | Nov. 22, 1887 |

FOREIGN PATENTS

| Number | Country | Date |
|---|---|---|
| 613,325 | France | Aug. 20, 1926 |
| 47,673 | France | Mar. 9, 1937 |
| 538,817 | Great Britain | Aug. 18, 1941 |